United States Patent
Lin

(10) Patent No.: US 6,796,537 B1
(45) Date of Patent: Sep. 28, 2004

(54) LIFTING BASE FOR A LCD MONITOR

(76) Inventor: Pei-Ching Lin, 4F, No. 11, Alley 8, lane 212, Chung Cheng Rd., Taipei (TW)

( * ) Notice: Subject to any disclaimer, the term of this patent is extended or adjusted under 35 U.S.C. 154(b) by 0 days.

(21) Appl. No.: 10/755,306

(22) Filed: Jan. 13, 2004

(51) Int. Cl.[7] .............................................. F16M 11/00
(52) U.S. Cl. .................... 248/162.1; 248/127; 248/917; 248/404; 248/149; 361/681
(58) Field of Search .............................. 248/676, 176.3, 248/125.8, 917, 176.1, 162.1, 404, 406.2, 149, 159, 157, 919, 127; 361/681, 682

(56) References Cited

U.S. PATENT DOCUMENTS

| | | | | |
|---|---|---|---|---|
| 4,395,010 A | * | 7/1983 | Helgeland et al. ........... | 248/371 |
| 4,690,362 A | * | 9/1987 | Helgeland .................... | 248/404 |
| 5,904,328 A | * | 5/1999 | Leveridge et al. ........ | 248/124.1 |
| 6,189,849 B1 | * | 2/2001 | Sweere et al. ........... | 248/286.1 |
| 6,352,226 B1 | * | 3/2002 | Gordon .................... | 248/125.2 |
| 6,655,645 B1 | * | 12/2003 | Lu et al. .................. | 248/176.1 |
| 6,695,266 B1 | * | 2/2004 | Tsai ......................... | 248/125.8 |
| 6,702,238 B1 | * | 3/2004 | Wang ....................... | 248/125.8 |
| 2004/0035989 A1 | * | 2/2004 | Sweere et al. .............. | 248/127 |
| 2004/0056161 A1 | * | 3/2004 | Ishizaki et al. .......... | 248/176.3 |
| 2004/0084585 A1 | * | 5/2004 | Watanabe et al. ........ | 248/276.1 |

FOREIGN PATENT DOCUMENTS

FR  2620323 A1 * 3/1989

* cited by examiner

*Primary Examiner*—Anita M. King
(74) *Attorney, Agent, or Firm*—Rosenberg, Klein & Lee

(57) ABSTRACT

A lifting base for a LCD monitor includes a frame, a lifting device and a pair of clamping members. The frame has two rails extending from two sides respectively. The lifting device has a pair of sliding parts and a pair of guiding plates. The sliding parts are connected at the bottom ends with the top ends spreading apart like the shape of an English letter V. Two outer edges of each sliding part are bent to form a guiding rail thereat. The sliding parts are secured with the guiding plates connected to a monitor. The guiding plates are inserted within the rails of the frame. The clamping members are two torque springs in an opposite position. Each clamping member has one end secured to the frame and another end connected with a roller to engage with the rail of each sliding part of the lifting device for locating purpose.

1 Claim, 4 Drawing Sheets

LIFTING BASE FOR A LCD MONITOR

FIELD OF THE INVENTION

This invention relates to a lifting base for a LCD monitor, and more particularly to a lifting base to adjust the monitor to a most appropriate position to a user.

BACKGROUND OF THE INVENTION

With the LCD monitor mass development, the market is gradually increasing. Every product has a lifting base to hold a monitor still and is able to adjust its height.

The adjustment of a prior art uses a spiral spring to balance the weight of the monitor while the spring hangs an extension bar of the monitor. The extension bar then slides along a rail to adjust the height of the monitor.

When the monitor reaches to its highest position, the spiral spring reels back. This balances the weight from the monitor. When the monitor is descended, the spiral spring extends to produce a torque force to balance the monitor.

However, since the spiral spring supports one single side, the extension of the spring will incline towards one side, which leads the monitor to incline as well.

SUMMARY OF THE INVENTION

It is the primary object of the present invention to provide a lifting base for a LCD monitor, which can hold the monitor to any predetermined position securely.

It is another object of the present invention to provide a lifting base for a LCD monitor, which is easy to operate.

It is a further object of the present invention to provide a lifting base for a LCD monitor, which is stable and steady.

DETAILED DESCRIPTION OF THE PREFERRED EMBODIMENT

Figure 1:
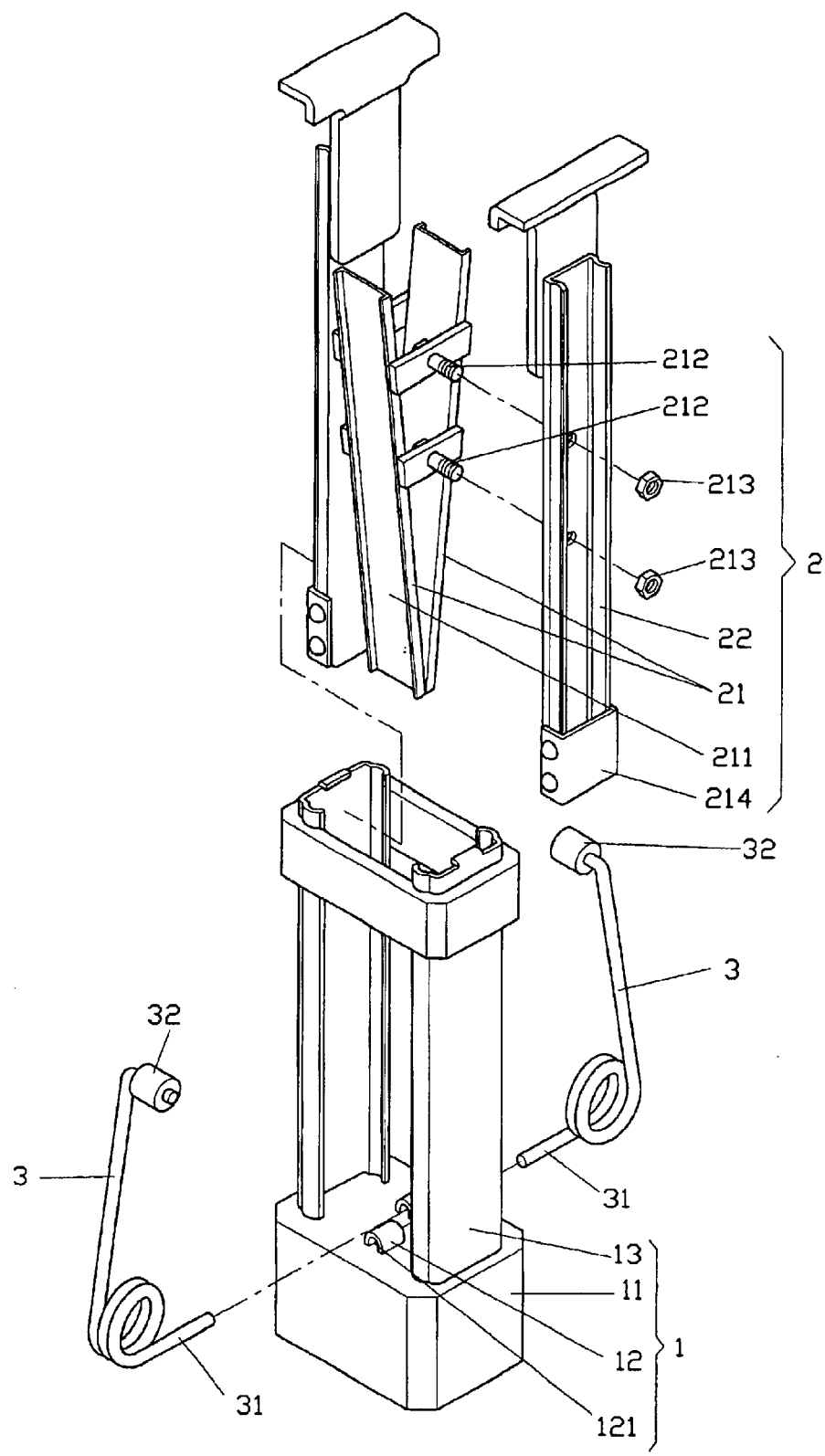
FIG. 1 is an exploded view of the present invention.

As shown in FIG. 1, the present invention comprises a frame 1, a lifting device 2 and a pair of clamping members 3.

The frame 1 has a base 11 at the bottom. The base 11 has a pair of locating ribs 12 on the top with a hole 121 on each rib 12, and a pair of rails 13 extending upwardly from respective sides of the base 1.

The lifting device 2 comprises a pair of sliding parts 21 and a pair of guiding plates 22. The sliding parts 21 are connected at the bottom ends with the top ends spreading apart like the shape of an English letter V. Two outer edges of each sliding part 21 are bent to form a guiding rail 211 thereat. The bottom end of each guiding plate 22 is formed with a trough 214 thereat. The guiding plates 22 are secured to the sliding parts 21 with bolts 212 and nuts 213. The guiding plates 22 are connected to two sides of a monitor (not shown in the drawings).

Each clamping member 3 is a torque spring having a securing end 31 and the other end connected with a roller 32.

Figure 2:
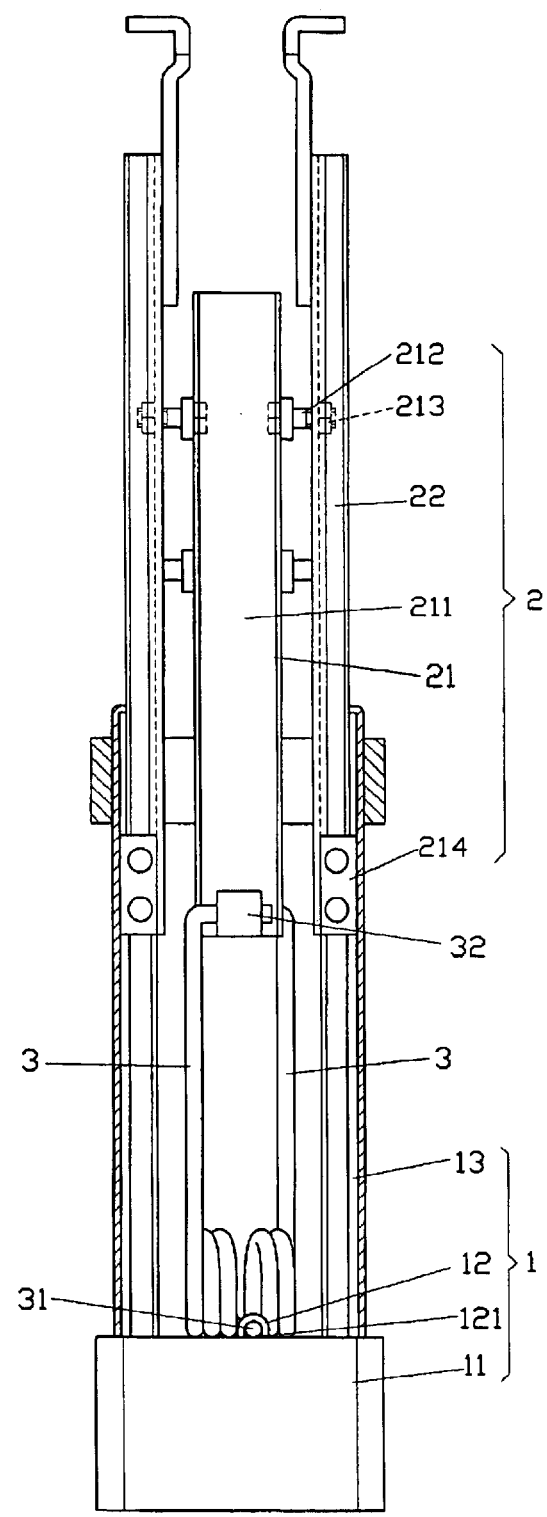
FIG. 2 is a front view of the present invention, partial sectioned.
Figure 3:
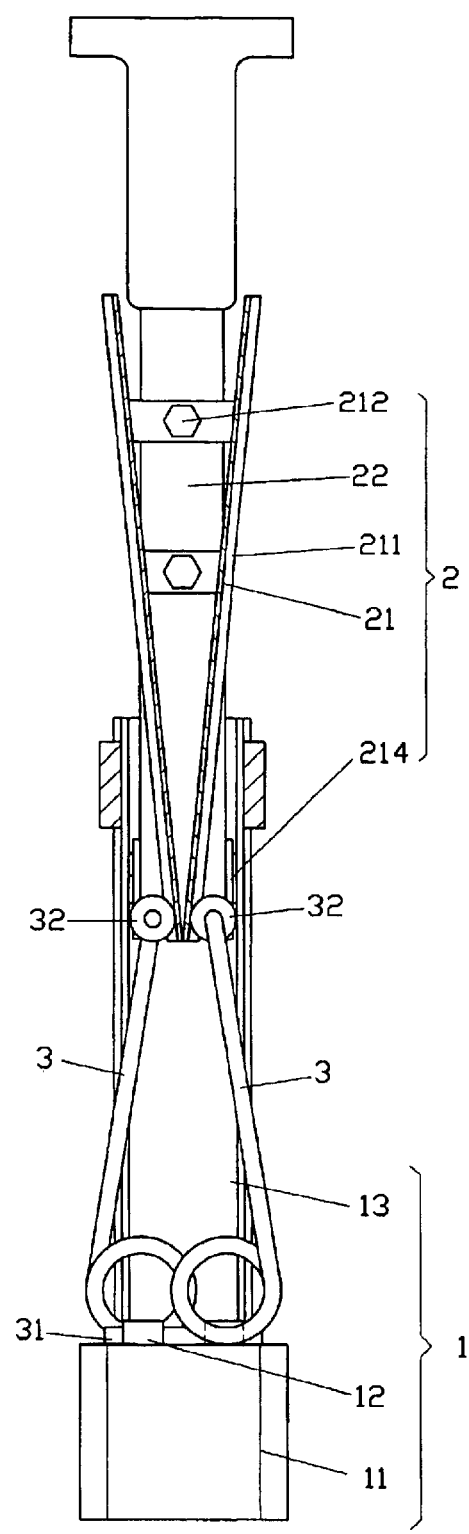
FIG. 3 is a side view of the present invention, partial sectioned.
Figure 4:
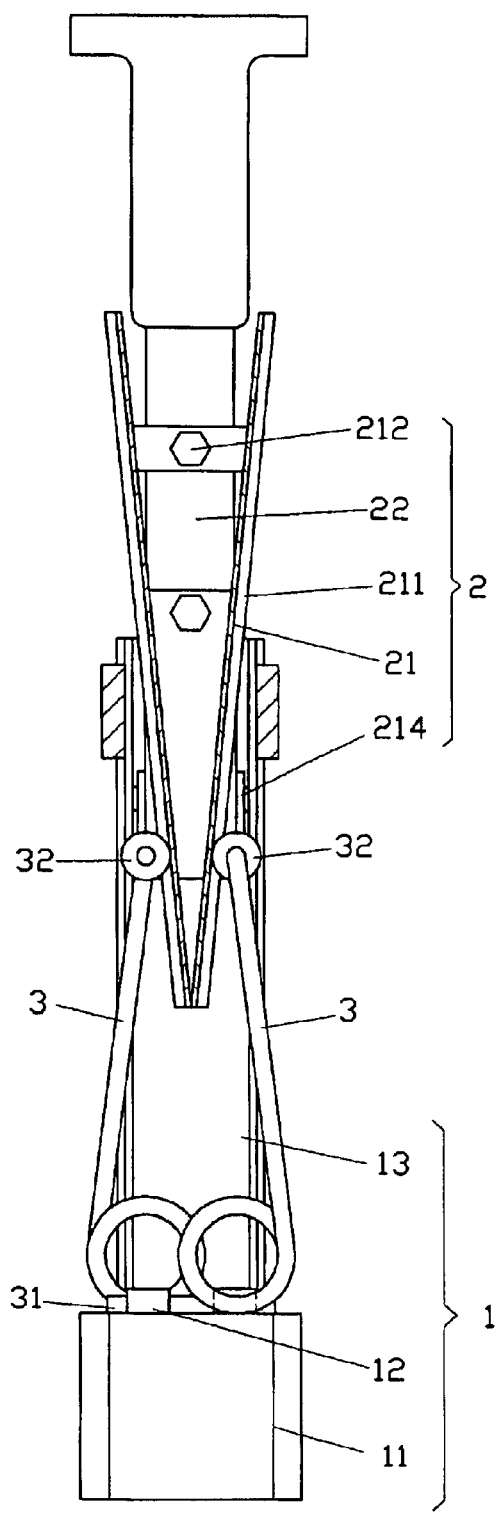
FIG. 4 is a view similar to FIG. 3, showing an operation of the present invention.

To assemble the present invention, as shown in FIGS. 2 and 3, the two securing ends 31 of the clamping members 3 are inserted into the holes 121 of the locating ribs 12 from respective sides whereas the rollers 32 of the clamping members 3 will engage with each other. The two guiding plates 22 of the lifting device 2 are inserted within the rails 13 of the frame 1. The bottom ends of the sliding parts 21 are slid within the clamping members 3 while the rollers 32 of the clamping members 3 are located in the rails 211 of the sliding parts 21. The clamping members 3 provide a clamping force on the sliding parts 21. Thus the lifting device 2 remains in a straight line moving up and down within the frame 1. The weight of the monitor will be borne by the sliding parts 21 and the clamping members 3 equally, regardless of the height or any movement To adjust the height of the monitor, simply pull or press the lifting device 2 to lift or to descend the monitor due to the V-shaped design of the sliding parts 21 and the clamping members 3 are tightly engaged with each other. The descent movement of the sliding parts 21 will always be clamped by the rollers 32 of the clamping members 3, regardless of the height, and always be in a steady status, as shown in FIG. 4. To lift the lifting device 2, a user needs to press the lifting device 2 down in a minus force so as to disengage the tight engagement of the rollers 32 of the clamping members 3 and the sliding parts 21, and the lifting device 2 may be pulled upward then. Until it reaches to a desired position, the two rollers 32 of the clamping members 3 will again clamp the sliding parts 21 in a steady manner.

I Claim:

1. A lifting base for a liquid crystal display (LCD) monitor comprising a frame, a lifting device, and a pair of clamping members, said frame comprising a base with a pair of rails extending from respective sides and opposing with each other;

said lifting device comprising a pair of sliding parts and a pair of guiding plates, said sliding parts being connected at bottom ends with top ends spreading apart like the shape of an English letter V, two outer edges of each sliding part being bent to form a guiding rail thereat, said sliding parts being secured with said guiding plates, said guiding plates being inserted within said rails of said frame;

said clamping members being two torque springs in an opposing position with each other, each clamping member having one end secured to said base of said frame and another end connected with a roller to engage with said rail of each said sliding part.

* * * * *